(12) United States Patent
Francis

(10) Patent No.: US 10,217,111 B2
(45) Date of Patent: Feb. 26, 2019

(54) SYSTEM AND METHOD FOR IN-AIR CUSTOMER SERVICE

(71) Applicant: GENESYS TELECOMMUNICATIONS LABORATORIES, INC., Daly City, CA (US)

(72) Inventor: Ethan Francis, Richardson, TX (US)

( * ) Notice: Subject to any disclaimer, the term of this patent is extended or adjusted under 35 U.S.C. 154(b) by 0 days.

(21) Appl. No.: 13/753,387

(22) Filed: Jan. 29, 2013

(65) Prior Publication Data

US 2014/0214466 A1 Jul. 31, 2014

(51) Int. Cl.
*G06Q 30/00* (2012.01)
*G06Q 50/30* (2012.01)

(52) U.S. Cl.
CPC .......... *G06Q 30/016* (2013.01); *G06Q 50/30* (2013.01)

(58) Field of Classification Search
CPC .............................. G06Q 30/016; G06Q 50/30
See application file for complete search history.

(56) References Cited

U.S. PATENT DOCUMENTS

| | | | | |
|---|---|---|---|---|
| 6,778,660 | B2 * | 8/2004 | Fromm | 379/265.02 |
| 6,810,527 | B1 * | 10/2004 | Conrad et al. | 725/76 |
| 7,472,080 | B2 * | 12/2008 | Goel | 705/5 |
| 8,078,163 | B2 * | 12/2011 | Lemond et al. | 455/431 |
| 8,254,914 | B2 * | 8/2012 | Lauer et al. | 455/431 |
| 8,280,964 | B2 * | 10/2012 | Sawant | 709/206 |
| 8,401,163 | B1 * | 3/2013 | Kirchhoff et al. | 379/201.01 |
| 2003/0040946 | A1 * | 2/2003 | Sprenger et al. | 705/6 |
| 2003/0055689 | A1 * | 3/2003 | Block et al. | 705/5 |
| 2005/0267786 | A1 * | 12/2005 | Lang | 705/5 |
| 2006/0059024 | A1 * | 3/2006 | Bailey et al. | 705/5 |
| 2006/0217851 | A1 * | 9/2006 | McGuffin et al. | 701/4 |
| 2007/0042772 | A1 * | 2/2007 | Salkini et al. | 455/431 |
| 2007/0198432 | A1 * | 8/2007 | Pitroda et al. | 705/64 |
| 2007/0265873 | A1 * | 11/2007 | Sheth et al. | 705/1 |
| 2008/0133705 | A1 * | 6/2008 | Lemond et al. | 709/217 |
| 2008/0140434 | A1 * | 6/2008 | O'Brien | 705/1 |
| 2009/0112639 | A1 * | 4/2009 | Robinson Beaver | 705/5 |
| 2009/0210262 | A1 * | 8/2009 | Rines et al. | 705/5 |
| 2009/0254971 | A1 * | 10/2009 | Herz et al. | 726/1 |

(Continued)

*Primary Examiner* — Matthew S Gart
*Assistant Examiner* — Scott M Ross

(57) ABSTRACT

A method has acts for receiving a transaction request in a contact center at a server having a processor, retrieving from data accompanying the transaction request identifying information regarding an originating node for the transaction request and identity of a sender of the transaction request, comparing the identifying information with stored data associating identifying information with specific aircraft providing on-board Internet service, discovering an association indicating the sender of the request is currently transacting as a passenger on a specific aircraft, retrieving further information regarding the passenger if available, retrieving information about the specific aircraft, including at least current flight status, routing the transaction request to an available contact center agent, connecting the passenger in a communication session with the agent, and displaying the information regarding the passenger, if any, and the information regarding the specific aircraft for use by the agent during the communication session with the passenger.

14 Claims, 6 Drawing Sheets

(56) References Cited

U.S. PATENT DOCUMENTS

| | | | |
|---|---|---|---|
| 2009/0276250 A1* | 11/2009 | King et al. | 705/5 |
| 2010/0296646 A1* | 11/2010 | Hemm et al. | 379/265.02 |
| 2010/0305983 A1* | 12/2010 | De Marcken | 705/5 |
| 2012/0246081 A1* | 9/2012 | Brown et al. | 705/304 |
| 2012/0278092 A1* | 11/2012 | Pfeffer | G06Q 50/00 705/1.1 |
| 2012/0303747 A1* | 11/2012 | Emberger et al. | 709/217 |

* cited by examiner

SYSTEM AND METHOD FOR IN-AIR CUSTOMER SERVICE

FIELD

The disclosure generally relates to the technical area of customer service provided by contact centers, and pertains more particularly to service for customers traveling in aircraft.

BACKGROUND

An important function of contact centers is providing service for customers of enterprises who host such centers, such as banks, airlines and the like. Customers of the host enterprises who call or message the contact centers are served by one or both of automated systems and connection to and interaction with agents operating on behalf of the center contact centers. Customers may connect to contact centers using a wide variety of communication appliances, and may interact through any known communication system, such as voice calls, either through the Internet network or land-line systems, text messaging, video conferencing, chat sessions, and email.

As mobile devices, like smart phones and tablet devices, have gained in computing power and memory capacity, and software applications have been provided to enhance communication capability for mobile devices, customers have become capable of interacting with contact centers from just about any place, stationary or in motion. It is quite common, for example, for a customer of an enterprise to use a mobile computing appliance like a smart telephone, enabled for voice and text communication, to interact with a contact center serving that enterprise and its customers. Such devices may operate through cellular telephone networks or, in some cases, directly though the internet where direct Internet connection is available, such as through a WiFi network.

There are some circumstances, however, where interaction with a contact center may be relatively complicated. One such circumstance is for persons in flight in private or commercial aircraft.

BRIEF SUMMARY

An aspect of an embodiment of the present invention is directed toward a system for allowing airline passengers to obtain customer service from the airline on which they are passengers.

According to an embodiment of the present invention there is provided a method including: receiving a transaction request in a contact center at a server having a processor; retrieving, from data accompanying the transaction request: identifying information regarding an originating node for the transaction request; and identity of a sender of the transaction request; comparing the identifying information with stored data associating identifying information with specific aircraft providing on-board Internet service; discovering an association indicating whether the sender of the request is currently transacting as a passenger, having a passenger ID, on a specific aircraft; retrieving further information regarding the passenger if available; retrieving information about the specific aircraft, including at least current flight status; routing the transaction request to an available contact center agent having an agent ID; connecting the passenger in a communication session with the agent; and providing the information regarding the passenger, if any, and the information regarding the specific aircraft for use by the agent during the communication session with the passenger.

In one embodiment, the transaction request is a chat request, the method further including: engaging the passenger in a chat session with the agent to whom the request is routed.

In one embodiment, the method includes: retrieving itinerary information regarding the passenger and flight status of aircraft other than the aircraft upon which the passenger is currently traveling as aids to the agent to whom the request is routed, in providing customer service to the passenger.

In one embodiment, the method includes: determining by the agent through interaction with the passenger, the passenger's desires regarding changes in travel itinerary, and making appropriate alterations based upon the determination.

In one embodiment, the method includes: composing a record of activity accomplished during the communication session; associating the record with one or more of the passenger ID, the agent ID, and the specific aircraft; and in the event that the communication session is interrupted, storing the activity record for possible resumption of the interrupted communication session.

In one embodiment, the method includes: receiving a new transaction request; determining from data accompanying the request whether there is a stored activity record of an interrupted communication session associated with the originator of the request; determining the original agent involved in the interrupted communication session; and attempting to route the new request to the original agent; failing to route to the original agent, routing the new request to an available agent.

In one embodiment, the method includes: resuming the communication session from the stored activity record, and continuing to update the record.

According to an embodiment of the present invention there is provided a method including: receiving a transaction request in a contact center at a server having a processor; retrieving, from data accompanying the transaction request, the identity of a sender of the transaction request; establishing a communication session between: an agent having an agent ID; and the sender of the transaction request; if the sender of the request is determined from stored information to be a passenger, having a passenger ID, scheduled to board a specific aircraft within a preprogrammed time duration: composing a record of activity accomplished during the communication session; associating the record with one or more of the passenger ID, the agent ID, and the specific aircraft upon which the sender is scheduled to board; and in the event that the communication session is interrupted, storing the activity record for possible resumption of the interrupted communication session.

In one embodiment, the method includes: receiving a new transaction request identified as originating through a WiFi system on the aircraft the passenger was scheduled to board; determining from data accompanying the request whether there is a stored activity record of an interrupted communication session associated with the originator of the request; determining the original agent involved in the interrupted communication session; attempting to route the new request to the original agent; and failing to route to the original agent, routing the new request to an available agent.

In one embodiment, the method includes: resuming the communication session from the stored activity record, and continuing to update the record.

According to an embodiment of the present invention there is provided a apparatus, including: a processor and a memory, the memory storing instructions that, when executed by the processor, cause the processor to: receive a transaction request; retrieve, from data accompanying the transaction request, identifying information regarding an originating node for the transaction request and the identity of a sender of the transaction request; compare the identifying information with stored data associating identifying information with specific aircraft providing on-board Internet service; discover an association indicating the sender of the request is currently transacting as a passenger, having a passenger ID, on a specific aircraft; retrieve further information regarding the passenger if available; retrieve information about the specific aircraft, including at least current flight status; route the transaction request to an available contact center agent having an agent ID; connect the passenger in a communication session with the agent; provide the information regarding the passenger, if any, and the information regarding the specific aircraft for use by the agent during the communication session with the passenger.

In one embodiment, the instructions, when executed by the processor, further cause the processor to: engage the passenger in a chat session with the agent to whom the request is routed, when the transaction request is a chat request.

In one embodiment, the apparatus includes causing the processor to: retrieve itinerary information regarding the passenger and flight status of aircraft other than the aircraft upon which the passenger is currently traveling as aids to the agent to whom the request is routed, in providing customer service to the passenger.

In one embodiment, the instructions, when executed by the processor, further cause the processor to: compose a record of activity accomplished during the communication session; associate the record with one or more of the passenger ID, the agent ID, and the specific aircraft; and in the event that the communication session is interrupted, store the activity record for possible resumption of the interrupted communication session.

In one embodiment, the instructions, when executed by the processor, further cause the processor to: receive a new transaction request; determine from data accompanying the request whether there is a stored activity record of an interrupted communication session associated with the originator of the request; determine the original agent involved in the interrupted communication session; attempt to route the new request to the original agent; and failing to route to the original agent, route the new request to an available agent.

In one embodiment, the instructions, when executed by the processor, further cause the processor to: resume the communication session from the stored activity record; and continue to update the record.

DETAILED DESCRIPTION

Figure 1:
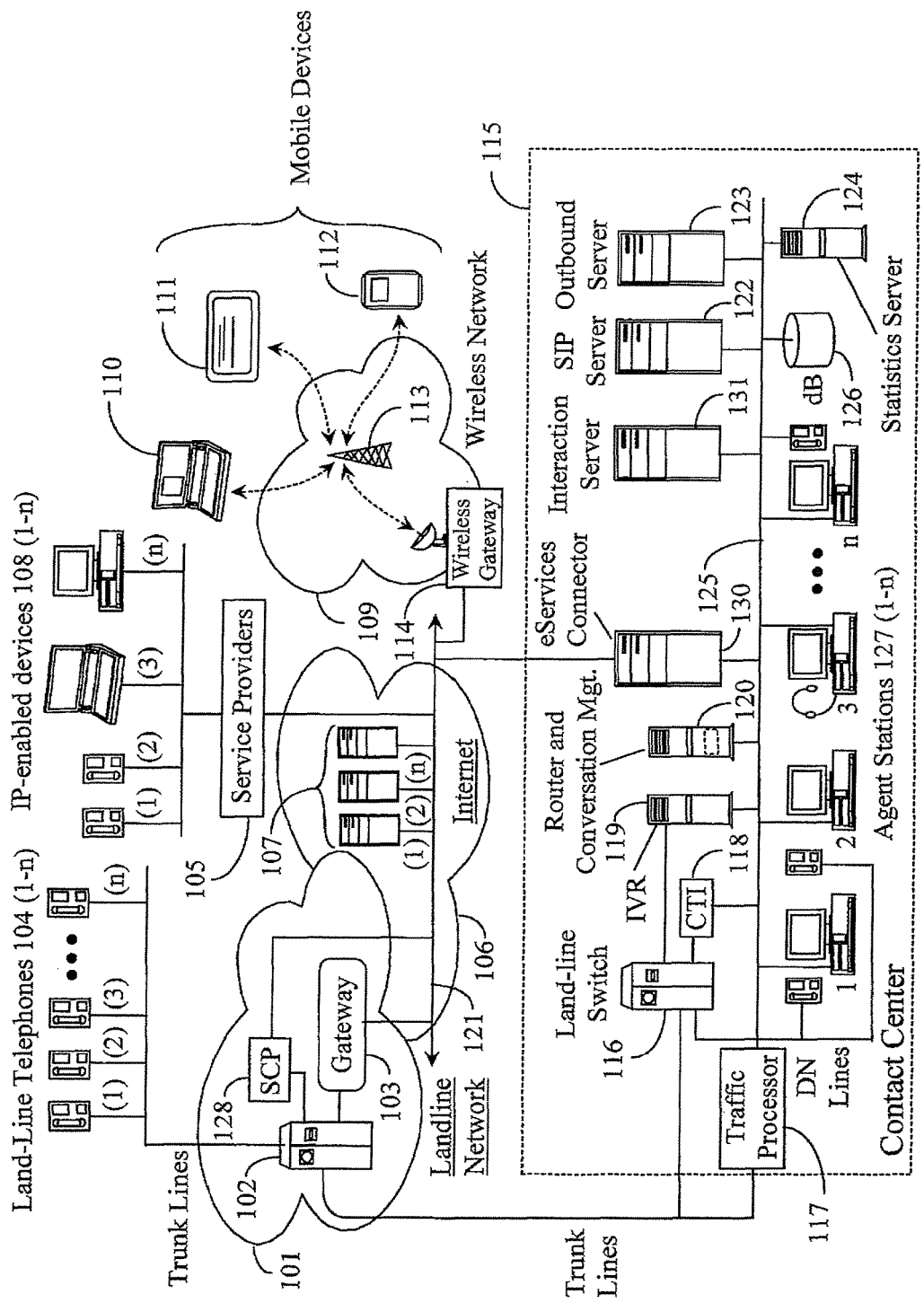
FIG. 1 is an architectural diagram illustrating a contact center and connectivity to the contact center for a variety of communication appliances.

One relatively complicated and under-served circumstance for interactions of customers with contact centers is the circumstance where a customer of an enterprise, on-board, for example, a commercial airline flight, wishes to contact the enterprise and transact business services. A particularly urgent circumstance is the situation where the enterprise is the airline providing the commercial flight.

At the time of filing the present patent application cellular voice calls from passengers in aircraft are not allowed, so such communication is restricted to communication which may be accomplished in text over data networks, such as the Internet network. This artificial limitation, however, is not a limitation to the present invention, which may be applicable regardless of the mode and protocol of communication from a customer to a contact center. To provide communication services for mobile devices on board aircraft at altitude is relatively more complicated than to provide similar services for the same devices at ground level, partly because the devices in the aircraft at altitude may be far removed from cellular base stations or any service for direct connection to the Internet network. Moreover, the device used by the customer in the aircraft may be moving at a high rate of speed relative to ground stations to which they may connect. To solve this problem some commercial enterprises have introduced systems for connecting in-flight customers with the Internet wherein an aircraft may have an on-board station to connect to mobile devices used by customers on the aircraft, and also to connect to a series of ground stations over which the aircraft may fly, or alternatively to one or more satellites enabled to provide connection to ground-based systems. More detail of such an arrangement is provided below.

The systems provided by enterprises to airlines to connect passengers on the airline to communication networks are relatively sophisticated, and charges may be higher than for similar services at ground level. In the application of these systems, a customer, who may, for example, be a frequent flyer wishing to connect to the Internet during a flight, may subscribe to a service and pay a monthly fee. One such service is GOGO™. A customer desiring to access the Internet as a passenger on commercial flights that are served by GOGO™ may subscribe to GOGO™ and pay a periodic fee, such as by the month, or may access the service and pay for the connection service for a particular flight, or a particular set of flights.

Of particular interest is the circumstance in which customers as passengers on a flight of a commercial aircraft may interact with a contact center representing the airline providing the flight. It is well-known that many things might go awry in the planned schedule of a particular commercial flight, such as, for example, late departure, mechanical difficulty, weather delay, and more, which may result in passengers arriving too late to make a connecting flight, or even arriving at a different airport. In these situations there is often a crush of activity after a delayed flight arrives, to book passengers on alternative flights, to make financial adjustments, to book passengers into hotels, and much more.

It is often known long before a delayed flight arrives that such amendments in schedules will have to be made, but automatic adjustments do not work, because the passengers may have preferences for accommodations, optional connecting flights, preferences due to different costs for different flights, and so on. To make such adjustments it is necessary for agents of the airline to interact with each passenger affected. Due to the frustration potential of delayed flights and missed connections, particularly the frustration of having to wait in long lines to reschedule after an aircraft has landed, a service that would allow customers as passengers on a flight that has a problem to interact with a contact center providing services for customers of the airline would be a valuable asset for the airline. Passengers could interact with an agent to select connecting flights, accommodations, ground transportation and the like during the flight after it is known that there may be problems.

FIG. 1 is a diagram illustrating a contact center 115 and a plurality of networks with interconnections whereby customers and remote agents may interact with the contact center. Customers and agents may interact with contact center 115 through communication appliances such as land-line telephones 104 (1-$n$), IP-enabled devices 108 (1-$n$), or through mobile appliances 110, 111 or 112. In some circumstances interaction may be limited to voice, but in other circumstances interaction my include text interaction, such as, for example, email, messaging services chat, and so on.

Persons interacting through land-line telephones 104 may connect firstly over trunk lines as shown to a network switch 102. Switch 102 may interact with hardware and software of a Service Control Point (SCP) 128, which may execute intelligent operations to determine to connect an incoming call to different ones of possible contact centers or to route an incoming call directly to an agent in a contact center or to an agent operating as a remote agent outside a contact center premises. Incoming calls in some circumstances may also be routed through a gateway 103 into the well-known Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line telephone 104 connecting to switch 102 may be routed to contact center 115 via trunk lines as shown to either a land-line switch 116 in contact center 115 or to a Traffic Processor 117. A contact center 115 may operate with just one of the land-line switch or the Traffic Processor, but in some circumstances may employ both incoming paths. Traffic Processor 117 may provide Session Border Control (SBC) functionality, may operate as a Media Gateway, or as a Softswitch, or in some combination.

Persons interacting through IP-enabled devices 108 (1-$n$) may interact through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as SKYPE™ or WebRTC. Similarly appliance 108($n$) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may comprise a great variety of Internet-connected servers 107 and IP-enabled devices with Internet access may connect to individual ones of such servers to access services provided. Servers 107 in the Internet may comprise email servers, text messaging servers, social networking servers, Voice over IP servers (VoIP), and many more, many of which users may leverage in interaction with a contact center such as contact center 115.

Another arrangement by which users and agents may interact with contact centers is through mobile devices, illustrated in FIG. 1 by devices 110, 11 and 112. Such devices may include, but are not limited to laptop computers, iPad devices and smart telephones. Such devices are not limited by a land-line connection or by a hard-wired Internet connection as shown for telephones 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices such as devices 110, 111 and 112 may connect to supplemental equipment operable in a moving vehicle. For example, cellular smart-phones may be enabled for near-field communication such as BLUETOOTH™, and may be paired with equipment in an automobile, which may in turn connect to the Internet network through satellite equipment and services, such as ON-STAR™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line telephones 104, IP-enabled devices 108 or mobile devices represented by devices 110, 111 or 112. Calls may be queued in any one of a variety of ways before connection to an agent, either locally-based or remote from the contact center, depending on circumstances.

Incoming calls to switch 116 may also be connected to an IVR server 119, which may serve to ascertain the purpose of the caller and other information useful in further routing of the call to final connection. A router and conversation manager server 120 may be leveraged for routing intelligence, of which there may be a great variety, and for association of the instant call with previous calls or future calls that might be made.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to call center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and the such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Serice (SMS) transactions, co-browsing sessions, and more. Interaction Server 131 may leverage services of other servers in the contact center, and available remotely as well.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other known communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A Data Base 126 may be provided to archive data and to provide temporary storage for many of the activities in contact center 115. An outbound server 123 is illustrated and may be used to manage outbound campaigns in the contact center, wherein calls may be made to destinations from a campaign list, and answered calls may be connected directly or be queued to be connected to agents involved in the outbound campaigns.

As described above, contact center 115, and the architecture and connectivity of the networks through which transactions are accomplished between customers and agents is exemplary, and there are a variety of ways that similar functionality might be attained with somewhat different architecture. The architecture illustrated is exemplary.

Figure 2:
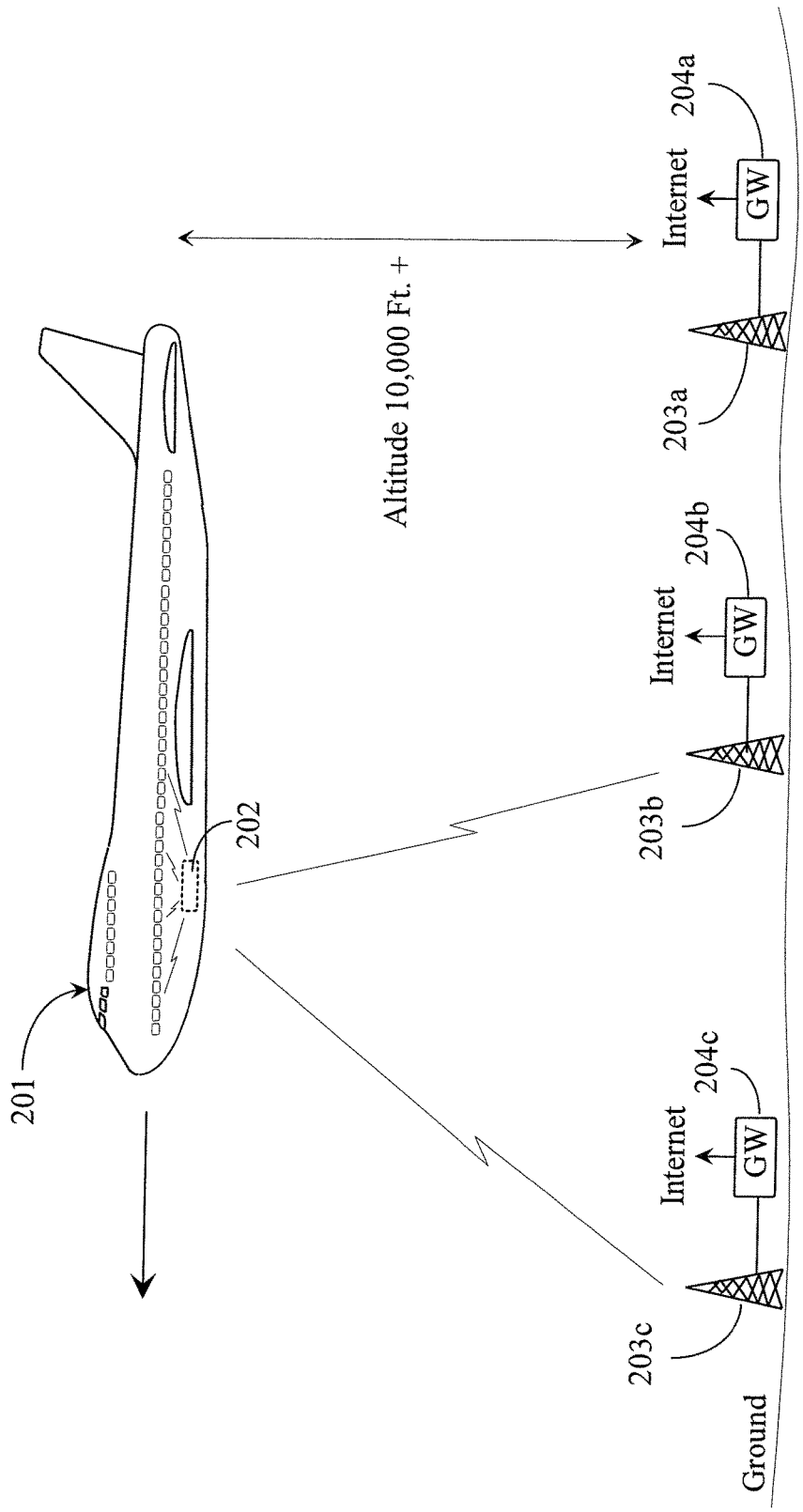
FIG. 2 is a diagram illustrating connectivity for persons in flight to contact centers.

FIG. 2 is a diagram illustrating a commercial airliner 201 in flight, the airliner equipped with on-board hardware and a system providing Internet access to passengers on board. There are a number of ways Internet access for passengers on an aircraft may be provided. One is a well-known service provided by GOGO™. In the GOGO™ service, the in-air equipment connects wirelessly with base stations at ground level represented by towers 203a, 203b and 203c. Towers 203a, 203b and 203c are coupled to gateways 204a, 204b and 204c, which in turn provide Internet connectivity. As airliner 201 progresses, base station 202 sequentially transitions from ground base stations over which the airliner may pass. A customer in the aircraft may connect to base station 202 providing WiFi service in the aircraft, hence to one of the ground base stations, and into the Internet via the gateway serving the active base station. Referring back to FIG. 1, one may consider tower 113 as one of towers 203a, 203b or 203c, and mobile devices 110, 111 and 112 as mobile devices that may be used by passengers on airliner 201.

Figure 3:
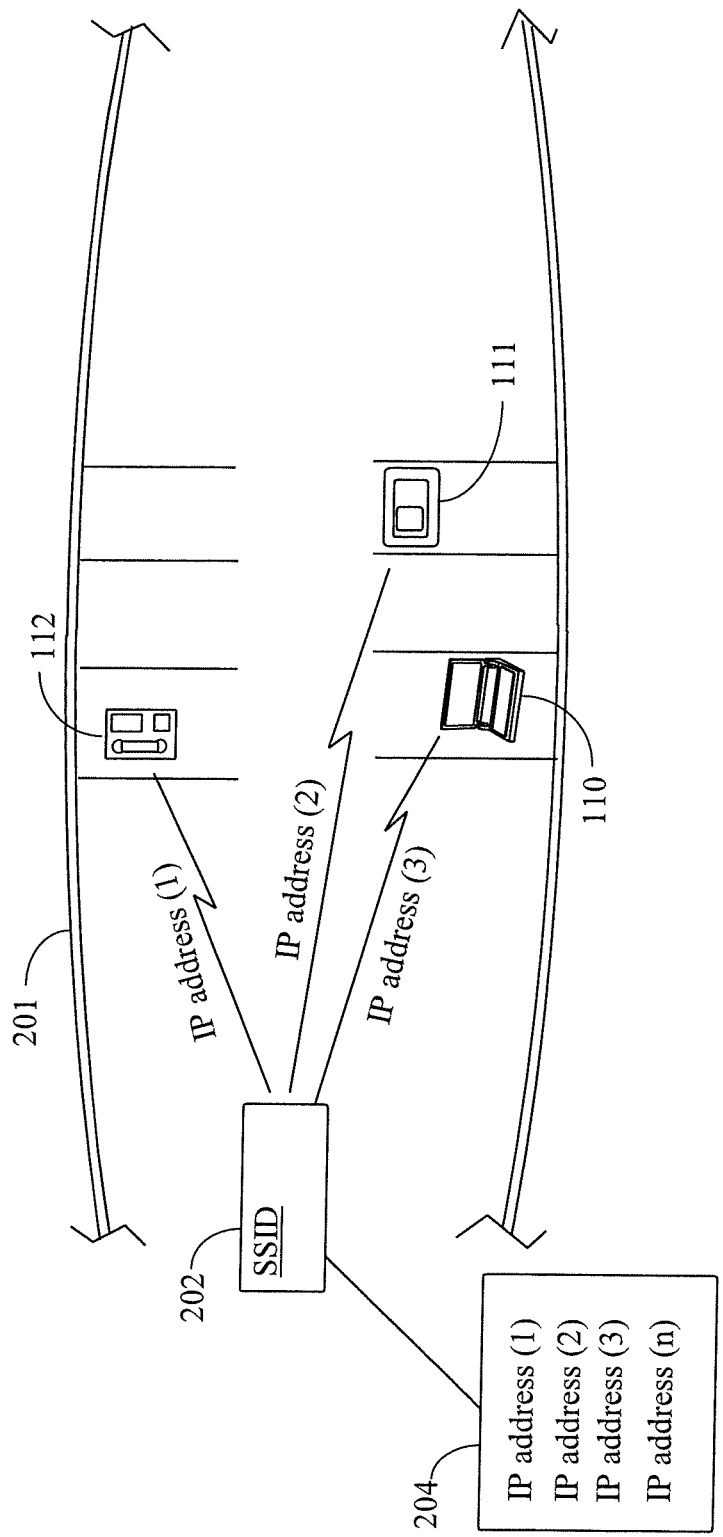
FIG. 3 is a plan view of a portion of a seating plan in an airliner, showing the in-aircraft base station and a few representative wirelessly-enabled appliances.

FIG. 3 is a plan view of a portion of a seating plan in airliner 201, showing the in-aircraft base station 202 and a few representative wirelessly-enabled appliances 301(a) through 301(n) that may be used by passengers in the aircraft. The appliances represented are exemplary, as there well may be hundreds of passengers on the flight, many who may have wirelessly-enabled appliances capable of connecting to station 202. In the architecture and operation of aircraft equipment enabling passengers to access the Internet with mobile devices, under some circumstances a set of IP addresses, as illustrated in list 204, may be reserved for temporary assignment to wirelessly-enabled appliances used by passengers on the aircraft. Further station 202 may be assigned a unique Service Set Identifier (SSID) number in the network. Three appliances are represented in FIG. 3, these being a smart phone 112, communicating with station 202 with IP address (1), a laptop computer 110 communicating via IP address (3), and a tablet device 111 communicating via IP address (2).

The description above is exemplary, and there may be other characteristics of in-aircraft equipment and service which may be leveraged to indicate that a contact in a call center has originated in a particular aircraft.

It was described briefly above that a particularly important circumstance is that circumstance in which the Airline enterprise may wish to provide customer service in-flight. Referring again to FIG. 1, the Airline enterprise may be represented for customer service by agents operating either locally at stations 127 in contact center 115 or remotely using appliances connecting to contact center 115. Customers seeking service may connect with the agents through on-board station 202 and then through a wireless network represented in FIG. 1 by network 109. These connections may come to contact center 115 through eServices Connector 130 in contact center 115.

For in-air customer service it is important that the contact center determine that an incoming transaction, whether a voice call or a text-based message, is from a customer in an aircraft associated with the airline host of the contact center. This may be done in either of two ways. The incoming transaction may have associated data identifying the SSID of station 202 in the aircraft, and/or one of the IP addresses reserved for the station assigned that SSID. It is important also that communication in aircraft is restricted at the time of filing the instant patent application to operation at or above 10,000 feet. Under 10,000 feet station 202 must be disabled, but this threshold is arbitrary and may change.

In one implementation of in-air customer service provided by an airline enterprise Internet service may be provided by GOGO™ or another service provider. base station 202 may operate much like similar base stations in, for example, fixed ground locations. A passenger's appliance, enabled for detecting wireless networks, when the appliance is turned on, will detect and list available networks, which in most cases may be limited to the WiFi hotspot provided in the aircraft. When the passenger selects that wireless network the appliance's browser will be directed to a home page of the Internet service provider. The home page may be hosted jointly by the service provider and the airline, so the airline may have a link for "Customer Service". The link may also indicate the airline name.

In one implementation the passenger (a customer of the airline) may not be a subscriber to the Internet service. In this instance selecting the "Customer Service" link may direct that passenger/customer to a website hosted by the airline without any charge to the passenger. So the customer service for that customer is free. The web site hosted by the airline may provide services for the passenger, such as checking the itinerary and enabling certain changes to be made. Service interacting with an agent, however, may not be available in this path. If the web site is enabled for Chat, there may be a link for the customer to initiate a chat request, in which case the customer may be immediately connected in a chat session, or may be placed in a hold queue to be connected in a chat session with an agent for the airline. Further description of customer service interaction through chat is provided below.

In some implementations the airline may announce availability of Internet connection and of availability of free customer service, and may provide written materials in individual ones of seatbacks instructing passengers how to connect for customer service.

In some instances a passenger may be subscribed to the service provider, paying, for example, a monthly fee for in-flight Internet access. In these instances the "free" aspect may be superfluous. If the passenger is not subscribed, the home page of the service provider may provide links and entry fields for the passenger to subscribe, or to purchase Internet access for the instant flight, or for a specified time period.

In some implementations a passenger may have a mobile device storing an executable chat application provided by the airline. In these implementations the passenger by launching the chat application may access the on-board WiFi and transmit a chat request to a contact center, such as contact center 115 in FIG. 1. Customer service chat operations are described in more detail below.

At the time of filing the present application chat is a preferred channel for interaction for customer service in flight, because at least in the US, in-flight telephone interaction is not allowed. In future, however, much or all of what is described herein accomplished through chat may be accomplished through voice interaction with an agent of the contact center hosted by the airline.

Figure 4:
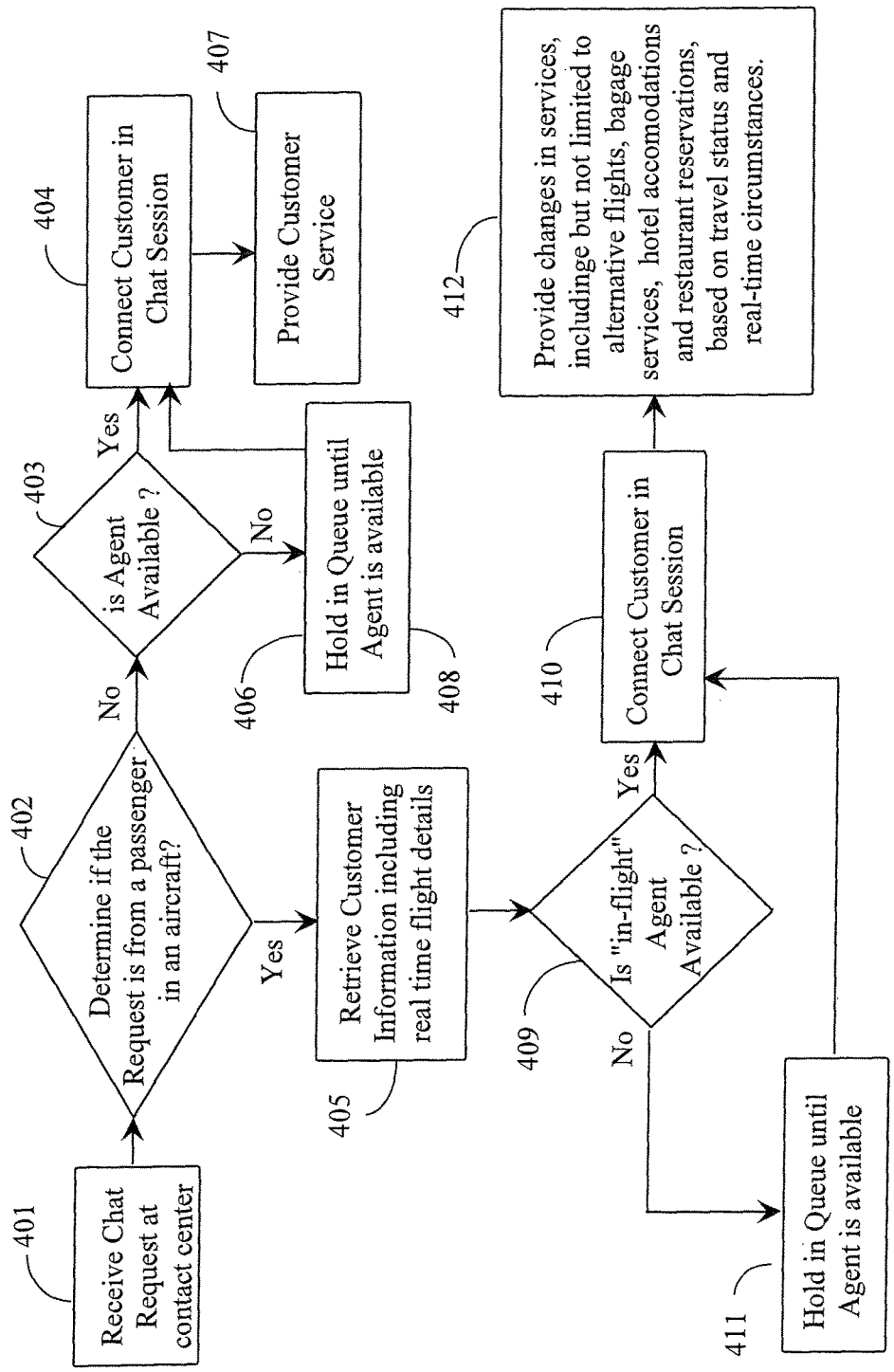
FIG. 4 is a flow chart illustrating acts in providing customer service for an airline through chat.

FIG. 4 is a flow chart illustrating acts in providing customer service for an airline through chat. At act 401 the contact center receives a chat request. This request may be processed through an eServices connector such as connector 130 illustrated in FIG. 1. Connector 130 leverages services of a server such as Interaction Server 131 illustrated in FIG. 1, which provides, among other functions, chat functions. Through software executed by a processor of server 131 it is determined at act 402 if the chat request received is from a passenger currently in an airline flying above 10,000 ft, or whatever other altitude limitation may be imposed. This determination may be made by data accompanying packets of the chat request, which data may identify the passenger, identify the SSID of a WiFi hotspot currently associated with a particular aircraft, and also may check the accompanying IP address of the sender of the request with a list of IP addresses currently associated with a particular SSID and/or aircraft.

If it is determined at act 402 that the chat request is not from a customer currently a passenger on a flight at altitude, then it is determined at act 403 whether an agent is available. If not, the chat request is held in queue at act 406 until an agent is available. At act 404, when an agent is available the customer is connected in a chat session with an agent. At act 407 the agent interacts with the customer, and provides services in response to customer's queries.

If it is determined at act 402 that the chat request is indeed from a passenger in an airline, and the passenger and the airline are identified, then at act 405 rich data concerning the customer/passenger and real-time flight status (as closely as is practical) is accessed from data stores available in the contact center, or accessible over one or more networks.

At act 405, depending on various data retrieved, intelligence may be exercised to provide alternatives for an agent who will serve the customer in a chat session. For example, it may be determined that customer Ethan Francois is a first-class passenger on AMERICAN AIRLINES™ (AA) flight 1127 in route from Chicago to Denver, and that the flight is twenty minutes ahead of schedule. In this example the contact center is providing customer service on behalf of AMERICAN AIRLINES™. It may also be determined that customer Francois is a "gold" customer for AA, that is a VIP, and historical transactions for customer Francois may be retrieved and processed.

The rich data available and assembled at act 405 may be organized in any of a variety of ways for an agent, and may be presentable to an agent through the agent's desktop application when the chat request is served and the customer is connected in a chat session with an agent.

While processing is accomplished at act 405, at act 409 it is determined whether or not an agent is available, or has capacity to handle the new chat request. If the answer is Yes, the customer may be connected at act 410 in a chat session, and the data retrieved and processed at act 405 may be presented to the agent and associated with the chat request and the customer.

If there is no agent available, or with bandwidth to serve, then the chat request is queued at act 411 until an agent is available. The customer may be notified of this circumstance in the display of the mobile appliance the customer is using on the aircraft. When an agent is available the chat request is connected at act 410.

An example of information that may be displayed to the customer in the customer's display, in response to queries the customer may make, may be flights earlier than a connecting flight upon which the customer is currently booked (it was determined the flight is twenty minutes ahead of schedule). AA may have a further motive for promoting booking on an earlier flight for this customer (and other customers on this flight as well) in the event that the earlier flights may be underbooked and the original connection may be overbooked. AA may offer one or more incentives for the customer to switch to the earlier flight.

In the event a flight is late and the customer may certainly miss a connection, AA may organize status of later flights that may be available for the customer to reach her final destination, and display this information for the agent who gets the chat request. In this circumstance AA may also show the agent available hotel accommodations, travel reservations, and restaurant reservations, among other services.

The organized alternative schedules and information are provided to the connecting agent in a manner that the agent may present attractive options to the customer in response to customer queries. In many implementations the agent may be enabled to present alternatives to the customer in the chat window on the customer's mobile appliance. There are a wide variety of services that may be provided to customers in flight in response to customer queries and desires, driven by near real-time circumstances of the customer and the status of the flight upon which the customer is a passenger.

FIG. 4 illustrates that a variety of focused services may be provided for customers who are, in fact, engaging customer service at altitude as passengers in an aircraft. The near real-time status information that may be available may determine a rich organization of alternatives that may be presented to a customer.

The above implementations are described as leveraging chat as a communication channel. This is because chat may be a preferred channel for a number of reasons. In circumstances where voice interaction is allowed in aircraft at altitude, other channels, including voice may be used. The data and information that may be retrieved based on the customer ID and flight status and the like may be the same or very similar regardless of the channel or channels of communication.

It was described above that Internet access is permitted in aircraft cruising above 10,000 feet presently, administered by the Federal Aviation Administration in the US. As an aircraft equipped for on-line access leaves the ground and gains altitude, when the aircraft has passed the 10,000 foot minimum, on-board control associated with station 202 may be exercised, and an announcement may be made to passengers that Internet access is available and may be used. Similarly, when the aircraft is approaching a destination and descending, there is a time when the aircraft will descend below the 10,000 foot minimum, and Internet access will be interrupted, which may be done by control associated with station 202 and/or announcement to passengers to turn off mobile devices.

Figure 5:
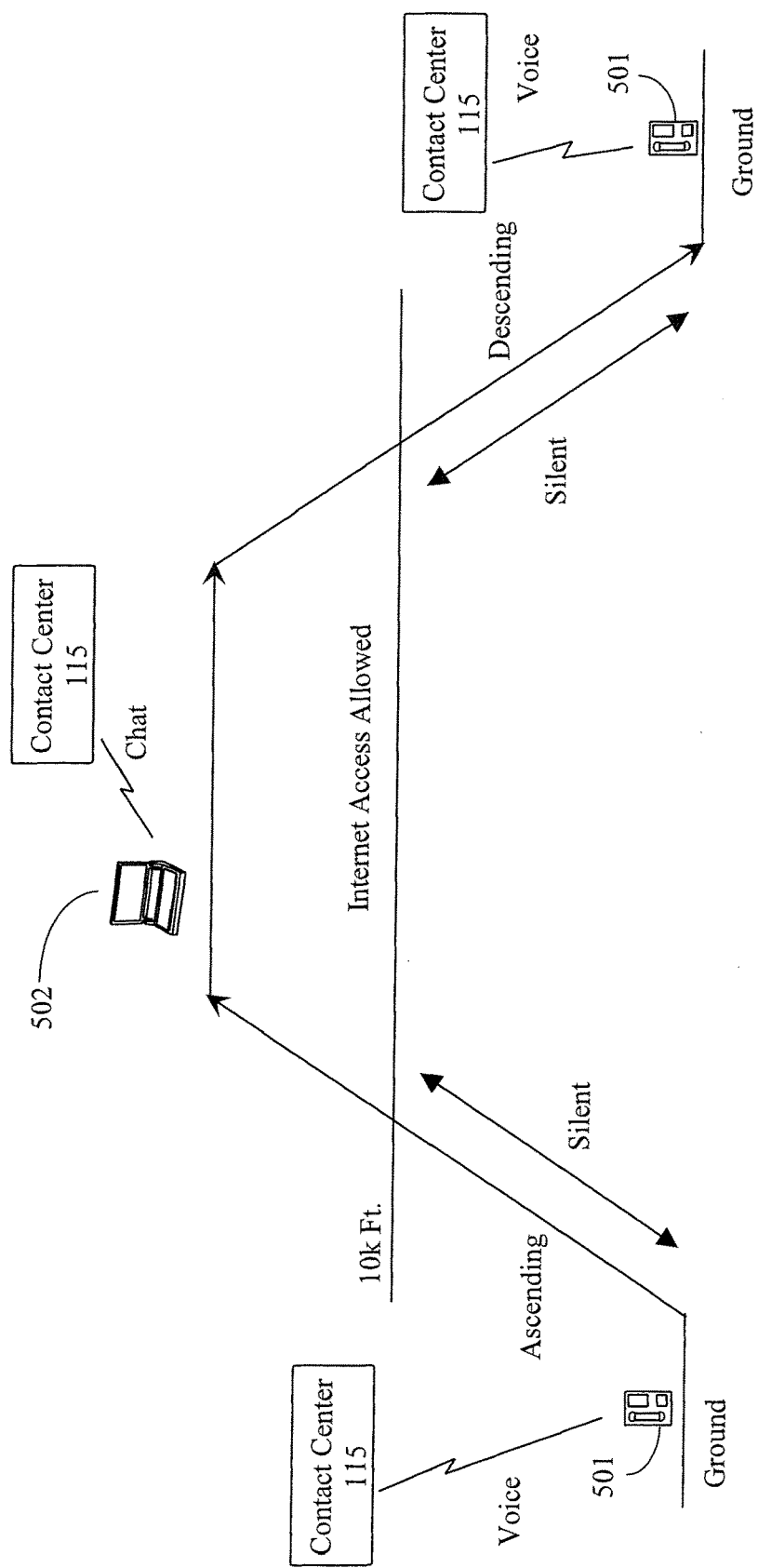
FIG. 5 is a schematic diagram illustrating connectivity transition situations both ascending and descending according to an embodiment of the present invention.

FIG. 5 illustrates transition situations both ascending and descending. From left to right the situation is shown first as a passenger at ground level using a telephone 501, engaged in voice communication with an agent in contact center 115. This passenger may be in a terminal waiting to board a flight, on the aircraft parked on the ground prior to takeoff before cellular communication is denied for takeoff, in a ground vehicle traveling toward the terminal, or in a restaurant or other facility at the terminal.

There may be a circumstance wherein this passenger has perhaps completed a part of his or her desired business with the agent at the contact center, but transaction is not finished at the time that the aircraft is ready to take off and mobile devices must be powered off. Thus there are two transition points in which communication between a passenger and an agent in the contact center may be interrupted. It is desirable that such interruption not force a passenger to start over in accomplishing needed changes in scheduled flights and other services.

In one implementation the agent with whom the passenger has been engaged, with aid of intelligence in the contact center, may suspend transaction with the passenger, with understanding that the session may be resumed at a later time at initiation of the passenger. There are a number of ways this function may be accomplished. In one implementation a step-by-step summary of transaction between the passenger and the agent may be recorded as steps occur, and at suspension that summary may be saved and associated with the passenger's ID, as an "unfinished session" summary. The aircraft that the passenger may board or have boarded, and hence the WiFi SSID, may also be known, and the summary may be associated at the contact center with the aircraft and the SSID as well, and may be associated with the agent with whom the passenger has been engaged. In one circumstance the passenger or the agent may voluntarily terminate the session and save the summary, or the saving may be automatic, forced by termination of communication from an external source, such as station 202.

Figure 6:
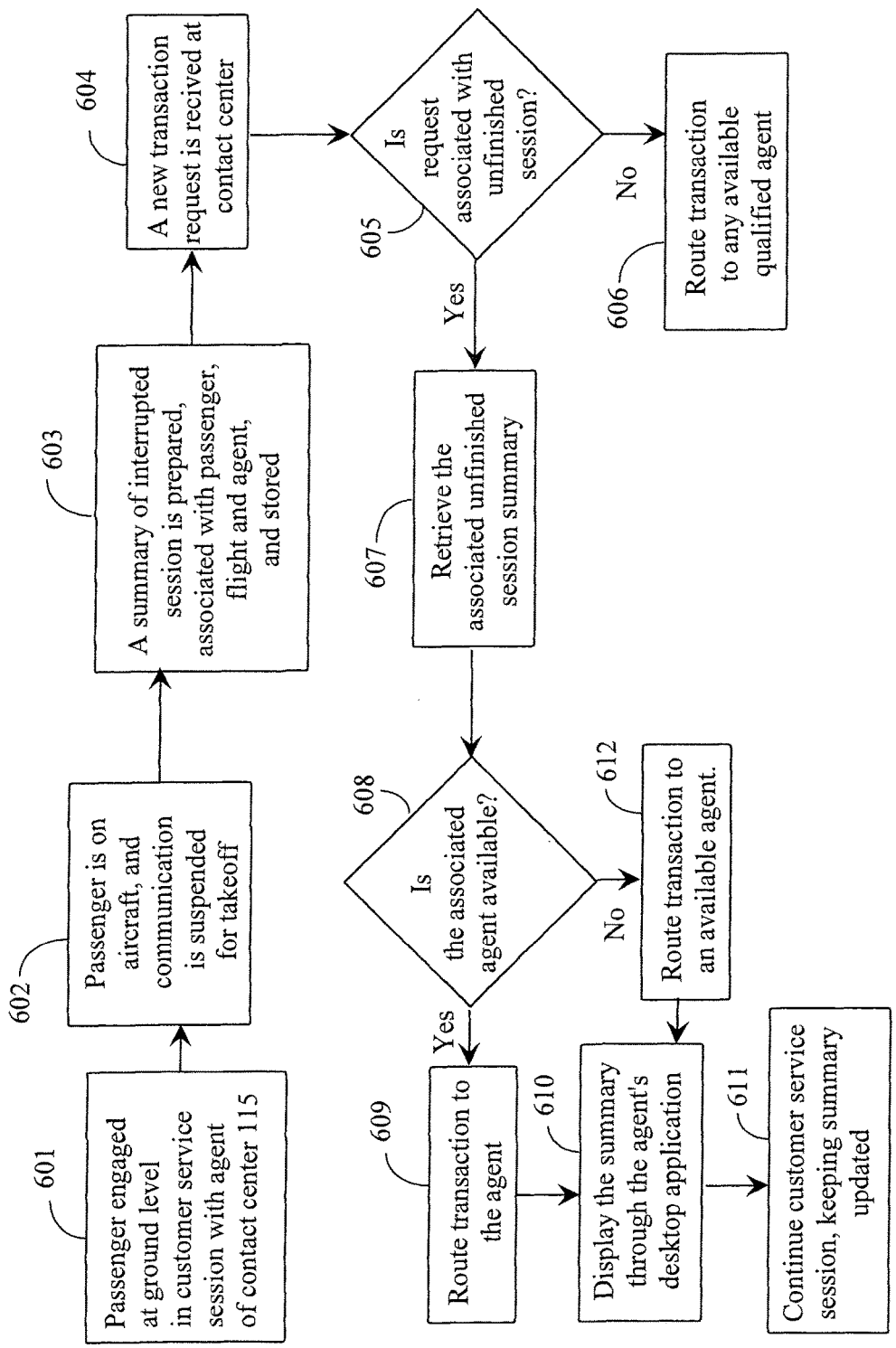
FIG. 6 is a flow chart illustrating a transition of communication for a passenger as a plane takes off and ascends to altitude, and eventually descends to landing according to an embodiment of the present invention.

FIG. 6 is a flow chart illustrating a transition of communication for the passenger as the plane takes off and ascends to altitude, and eventually descends to landing. At act 601a passenger is engaged at ground level in a customer service session with an agent of a contact center for the airline host of a flight that the passenger has booked. At act 602 the passenger is on the aircraft and communication is suspended for takeoff. Suspension may be a trigger for preparing an "unfinished session" summary, which is associated at least with the passenger ID, and may also be associated with the flight and the agent.

After takeoff the aircraft gains altitude, and there is a silent period during which passengers may not access the Internet. Above 10,000 feet Internet access is enabled, and an announcement may be made that passengers may access the Internet. The passenger for whom a customer service session was interrupted at act 602 may now contact the contact center. The contact may now be through a chat application, rather than the voice channel originally used when the passenger was at ground level.

Assuming the passenger does transmit a chat request to the contact center after the aircraft ascends above 10,000 feet, that chat request will come to the contact center along with many other media requests. At act 604 a new transaction request is received at the contact center from the Internet through eService connector 130. At step 605 the request is processed against known "unfinished session" summaries. The association may be made through data in the request identifying both the aircraft (through station SSID) and the passenger ID. If an association is found, it may also be determined if the timing is reasonable for a reconnect and resumption of the interrupted session. If no association is found, at act 606 the incoming request is routed to an available agent.

If the association is found, the associated interrupted session summary is retrieved at act 607. At act 608 it is determined if the original agent is available to resume the interrupted session. If not, at act 612 the request is routed to an available agent. If the original agent is available, or will shortly be available, the request is routed to that agent as the best choice to continue the customer service session. Regardless of the agent to whom the request is routed, at act 610 the summary is displayed through the desktop application for the agent to whom the request is routed. At act 611 the session is resumed, and the passenger is engaged.

It may be that during the flight the session is completed. However a summary may be updated in the resumed session as well against the possibility that the passenger may reconnect later in the flight and wish to make some further change. It may be that the passenger reconnects too late in the flight to complete the session before the aircraft descends at destination, and communication is again suspended for the descent and landing of the aircraft. If this should be the case the passenger may reconnect after landing, using the same or another channel, and the contact center intelligence may find association with the twice interrupted session, and attempt to reconnect the passenger with the same agent to complete the session.

It may be that the passenger first makes contact for service while in the aircraft at altitude. The same logic applies as described above. Each time the passenger is forced to break off communication, an unfinished summary is prepared, associated and stored. In many implementations there may be a mechanism for the agent or the passenger to signal that the goals are accomplished and that the session is finished. In this circumstance the summary or summaries may be further tagged as to completion.

It is not required that the passenger/customer use the same media channel each time that he or she requests resumption of a session. It is only necessary that the contact center intelligence check association of the customer and accompanying data against identity of unfinished session summaries for each incoming request, regardless of media channel.

There are many alterations possible in implementations described above. The breadth of the invention is limited only by the claims below.

What is claimed is:

1. A method comprising:
   receiving, by a processor, a first transaction request from a first originating node, the first transaction request being in response to a first contact center service request transmitted by a sender;
   routing, by the processor, the first transaction request to a first available contact center agent;
   connecting, by the processor, the sender in a communication session with the first contact center agent;
   determining, by the processor, that the sender will be a passenger onboard a specific aircraft;
   determining, by the processor, flight information of the specific aircraft;
   detecting, by the processor, end of the connection prior to finishing the communication session;
   storing, by the processor, first data regarding the communication session as a first unfinished session in response to detecting the end of the connection, the first data including information for identifying the sender and the first contact center agent engaged in the communication session;
   receiving, by the processor, a second transaction request from a second originating node within the specific aircraft, wherein the second transaction request is received while the specific aircraft is above a particular altitude, the second transaction request being in response to a second contact center service request transmitted by an end user device of the sender, the second transaction request including an identifier identifying the second originating node, wherein the second originating node is configured to:
      identify an IP address from a list of reserved IP addresses;
      assign the IP address to the end user device for enabling Internet access by the end user device when the specific aircraft is above the particular altitude; and
      disable Internet access by the end user device when the specific aircraft is below the particular altitude;
   retrieving, by the processor, based on data accompanying the second transaction request, the identifier identifying the second originating node;
   comparing, by the processor, the identifier with stored data associating the identifier with the specific aircraft providing on-board Internet service;
   determining, by the processor, whether the sender is currently onboard the specific aircraft;
   determining, by the processor, whether the sender is currently transacting as a passenger;
   in response to determining that the sender is currently onboard the specific aircraft transacting as a passenger, automatically searching, by the processor, for current flight status information of the specific aircraft, wherein the automatic searching is not performed if the sender is not currently onboard any aircraft transacting as a passenger;
   retrieving, by the processor, the current flight status information in response to the searching;
   detecting, by the processor, based on the stored data, that the first unfinished session associated with the sender exists;
   retrieving, by the processor, the stored data regarding the communication session;
   automatically identifying, by the processor, the first contact center agent from the stored data; and
   routing, by the processor, in response to determining that the sender is currently onboard the specific aircraft transacting as a passenger, the second transaction request to a second contact center agent, wherein if the first contact center agent is available then the second contact center agent is the same agent as the first contact center agent and if the first contact center agent is not available then the second contact center agent is an available contact center agent;
   resuming, by the processor, the suspended communication session between the sender and the second contact center agent; and
   providing, by the processor, the retrieved current flight status information to the second contact center agent during the resumed communication session with the sender.

2. The method of claim 1 wherein one of the first or second transaction requests is a chat request, the method further comprising:
   engaging, by the processor, the sender in a chat session with the first or second contact center agent to whom the first or second transaction request is routed.

3. The method of claim 1 further comprising:
   retrieving, by the processor, itinerary information regarding the sender and flight status of aircraft other than the specific aircraft upon which the passenger is currently traveling as aids to the second contact center agent to whom the second transaction request is routed, in providing customer service to the sender.

4. The method of claim 1 further comprising:
   receiving, by the processor, user input for making alterations to a travel itinerary for the sender.

5. The method of claim 1, wherein the first data comprises a record of activity accomplished during the communication session.

6. An apparatus, comprising:
   a processor; and
   a memory, the memory storing instructions that, when executed by the processor, cause the processor to:

receive a first transaction request from a first originating node, the first transaction request being in response to a first contact center service request transmitted by a sender;
route the first transaction request to a first available contact center agent;
connect the passenger in a communication session with the first contact center agent;
determine that the sender will be a passenger onboard a specific aircraft;
determine flight information of the specific aircraft;
detect end of the connection prior to finishing the communication session;
store first data regarding the communication session as a first unfinished session in response to detecting the end of the connection, the first data including information for identifying the sender and the first contact center agent engaged in the communication session;
receive a second transaction request from second originating node within the specific aircraft, wherein the second transaction request is received while the specific aircraft is above a particular altitude, the second transaction request being in response to a second contact center service request transmitted by an end user device of the sender, the second transaction request including an identifier identifying the second originating node, wherein the second originating node is configured to:
identify an IP address from a list of reserved IP addresses;
assign the IP address to the end user device for enabling Internet access by the end user device when the specific aircraft is above the particular altitude; and
disable Internet access by the end user device when the specific aircraft is below the particular altitude;
retrieve, based on data accompanying the second transaction request, the identifier identifying the second originating node;
compare the identifier with stored data associating the identifier with the specific aircraft providing on-board Internet service;
determine whether the sender is currently onboard the specific aircraft;
determine whether the sender is currently transacting as a passenger;
in response to determining that the sender is currently onboard the specific aircraft transacting as a passenger, automatically search for current flight status information of the specific aircraft, wherein the automatic searching is not performed if the sender is not currently onboard any aircraft transacting as a passenger;
retrieve the current flight status information in response to the searching;
detect, based on the stored data, that the first unfinished session associated with the sender exists;
retrieve the stored data regarding the communication session;
automatically identify the first contact center agent from the stored data; and
route, in response to determining that the sender is currently onboard the specific aircraft transacting as a passenger, the second transaction request to a second contact center agent, wherein if the first contact center agent is available then the second contact center agent is the same agent as the first contact center agent and if the first contact center agent is not available then the second contact center agent is an available contact center agent;
resume the suspended communication session between the sender and the second contact center agent; and
provide the retrieved current flight status information to the second contact center agent during the resumed communication session with the sender.

7. The apparatus of claim 6 wherein the instructions, when executed by the processor, further cause the processor to:
engage the sender in a chat session with the first or second contact center agent to whom the first or second transaction request is routed, wherein one of the first or second transaction requests is a chat request.

8. The apparatus of claim 6, wherein the instructions, when executed by the processor, further cause the processor to:
retrieve itinerary information regarding the sender and flight status of aircraft other than the specific aircraft upon which the passenger is currently traveling as aids to the second contact center agent to whom the second transaction request is routed, in providing customer service to the sender.

9. The apparatus of claim 6, wherein the second data comprises a record of activity accomplished during the communication session.

10. The method of claim 1, wherein the second originating node is configured to suspend the second transaction request in response to determining that the elevation of the specific aircraft fails to satisfy the elevation criteria.

11. The method of claim 1, wherein the identifier identifying the second originating node is a unique service set identifier identifying a wireless network, wherein the sender accesses a sender communication device for transmitting the service request, the sender communication device being assigned an IP address, wherein both the service set identifier of the second originating node and the IP address of the sender communication device are transmitted in the second transaction request by the second originating node.

12. The method of claim 11, wherein a plurality of communication devices within the specific aircraft are invoked by a plurality of senders for transmitting a plurality of service requests to the second originating node, each of the plurality of communication devices being associated with a different IP address, wherein each different IP address is associated with the unique service set identifier, wherein the determining, by the processor, whether the sender is currently onboard the specific aircraft transacting as a passenger further includes:
identifying, by the processor, the IP address received in the second transaction request as being associated with the unique service set identifier, wherein the communication session is enabled in response to the identifying.

13. The method of claim 1, further comprising:
suspending, by the processor, the resumed communication session based on a second request of the second contact center agent;
storing, by the processor, second data regarding the resumed communication session as a second unfinished session in response to suspending the resumed communication session, the second data including information for identifying the sender and the second contact center agent engaged in the resumed communication session;
receiving, by the processor, a third transaction request from a third originating node, the third transaction request being in response to a third contact center service request transmitted by the sender;

detecting, by the processor, based on the stored second data, that the second unfinished session associated with the sender exists;

retrieving, by the processor, the stored second data regarding the communication session;

automatically identifying, by the processor, the second contact center agent from the stored second data; and routing, by the processor, the third transaction request to a third contact center agent, wherein if the second contact center agent is available then the third contact center agent is the same agent as the second contact center agent and if the second contact center agent is not available then the third contact center agent is an available contact center agent.

14. The apparatus of claim 6 wherein the instructions, when executed by the processor, further cause the processor to:

suspend the resumed communication session based on a second request of the second contact center agent;

store second data regarding the resumed communication session as a second unfinished session in response to suspending the resumed communication session, the second data including information for identifying the sender and the second contact center agent engaged in the resumed communication session;

receive a third transaction request from a third originating node, the third transaction request being in response to a third contact center service request transmitted by the sender;

detect, based on the stored second data, that the second unfinished session associated with the sender exists;

retrieve the stored second data regarding the communication session;

automatically identify the second contact center agent from the stored second data; and route the third transaction request to a third contact center agent, wherein if the second contact center agent is available then the third contact center agent is the same agent as the second contact center agent and if the second contact center agent is not available then the third contact center agent is an available contact center agent.

* * * * *